T. J. BARRON.
Lamp Burner.
No. 34,390.
Patented Feb. 11, 1862.
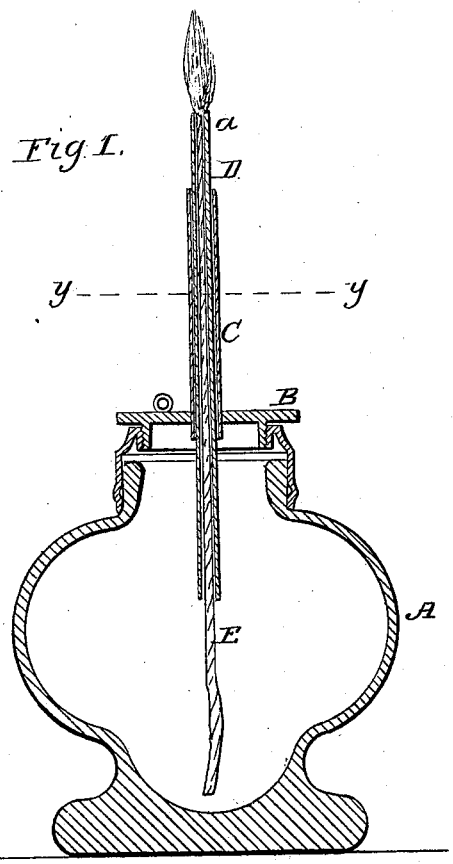
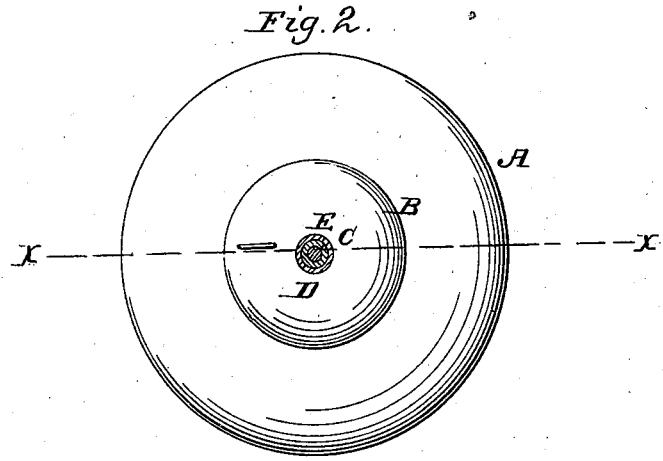

UNITED STATES PATENT OFFICE.

THOMAS J. BARRON, OF BROOKLYN, ASSIGNOR TO JAMES HORNER, OF NEW YORK, N. Y.

IMPROVEMENT IN LAMPS.

Specification forming part of Letters Patent No. 34,390, dated February 11, 1862.

*To all whom it may concern:*

Be it known that I, THOMAS J. BARRON, of Brooklyn, in the county of Kings and State of New York, have invented a new and Improved Lamp; and I do hereby declare that the following is a full, clear, and exact description of the same, reference being had to the accompanying drawings, making a part of this specification, in which—

Figure 1 is a vertical central section of my invention, $x\ x$, Fig. 2, indicating the line of section; Fig. 2, a horizontal section of the same, taken in the line $y\ y$, Fig. 1.

Similar letters of reference indicate corresponding parts in the two figures.

This invention relates to an improved lamp for burning coal-oils without a glass chimney; and it consists in having the wick of the lamp fitted in a tube of glass or burnt clay, which substances are good non-conductors of heat, and by which the oil is prevented from being volatilized too rapidly or in greater proportion than the supply of oxygen requires, thereby insuring perfect combustion and consequently a good illuminating-flame.

To enable those skilled in the art to fully understand and construct my invention, I will proceed to describe it.

A represents the body or fountain of a lamp, which may be constructed of any of the materials now used for such purpose and of any suitable form.

B is the cap or lamp-top, and C the wick-tube, such as is ordinarily employed.

D represents a tube of glass or burnt clay. This tube D is fitted within the tube C and may extend down within the body of the lamp. Within the tube D the wick E is placed. The wick does not extend upward quite as high as the tube D, and the upper end of the latter is bent or curved inward, as shown at $a$, Fig. 1, so as to slightly contract its orifice.

The tube D, in consequence of being constructed of the materials specified, prevents the oil from being rapidly volatilized, and hence the gas will not be generated too rapidly for the supply of oxygen. The result is a good illuminating-flame without the emission of smoke or an unpleasant odor.

It is necessary to leave the top of the wick E a trifle below the tube D in order to prevent the wick from crusting, and also to prevent the generating of an excess of gas or vapor. For the same reason the upper end of the tube D is slightly contracted, and this contraction also serves as a guide for adjusting the wick E properly in the tube D, preventing the former from extending too far up in the tube. This will be fully understood by referring to Fig. 1.

A metal wick-tube soon becomes heated after the lamp is lighted and vaporizes coal-oils quite rapidly. Hence said oils, as well as other volatile hydrocarbons, cannot be burned successfully for illuminating purposes without a chimney to create a draft, and a chimney-lamp cannot well be used as a portable or hand lamp.

The within-described invention does not preclude the use of caps or other devices which are frequently applied to lamp-tops to increase the draft, and in certain cases the application of such devices may be desirable.

Having thus described my invention, what I claim as new, and desire to secure by Letters Patent, is—

1. The employment or use in a lamp for burning coal-oils or other similar hydrocarbons, of a wick-tube D, constructed of glass or burnt clay, as and for the purpose specified.

2. Having the tube D constructed with a contracted orifice $a$, as and for the purpose set forth.

THOMAS J. BARRON.

Witnesses:
RICHARDSON GAWLEY,
JAMES LAIRD.